United States Patent [19]
Vezzoli et al.

[11] Patent Number: 5,622,763
[45] Date of Patent: Apr. 22, 1997

[54] HYDROCARBON VAPOR-IMPERVIOUS CONTAINERS AND PROCESS FOR PRODUCING THEM

[75] Inventors: Annibale Vezzoli, Como; Aldemaro Ciaperoni, Milan; Piero Furlan, Treviso, all of Italy

[73] Assignee: Montedipe S.r.l., Italy

[21] Appl. No.: 681,346

[22] Filed: Jul. 22, 1996

Related U.S. Application Data

[62] Division of Ser. No. 380,920, Jan. 31, 1995, Pat. No. 5,567,491, which is a continuation of Ser. No. 144,630, Nov. 2, 1993, abandoned, which is a continuation of Ser. No. 914,222, Jul. 17, 1992, abandoned, which is a continuation of Ser. No. 483,650, Feb. 23, 1990, abandoned.

[30] Foreign Application Priority Data

Feb. 23, 1989 [IT] Italy ..................... 19546/89

[51] Int. Cl.⁶ .................. B32B 27/34; B65D 65/40
[52] U.S. Cl. .............. 264/45.7; 264/113; 264/114; 264/255; 264/311
[58] Field of Search .................. 264/45.7, 113, 264/114, 255, 311, DIG. 56, DIG. 57, DIG. 18

[56] References Cited

U.S. PATENT DOCUMENTS

| | | | |
|---|---|---|---|
| 3,275,733 | 9/1966 | Schule et al. | 264/310 |
| 3,976,821 | 8/1976 | Carrow et al. | 428/474 |
| 4,261,473 | 4/1981 | Yamada et al. | 215/16 |
| 4,490,520 | 12/1984 | Ogasa et al. | 522/315 |

FOREIGN PATENT DOCUMENTS

| | | |
|---|---|---|
| 0461836 | 12/1991 | European Pat. Off. |
| 2057709 | 5/1972 | Germany |
| 2215817 | 7/1975 | Germany |
| 2820180 | 11/1979 | Germany |
| 1133840 | 11/1968 | United Kingdom |

Primary Examiner—Charles Nold

[57] ABSTRACT

Containers, which are impervious to hydrocarbon vapors, in particular to fuel vapors, and comprise an outer shell of plastic material, which is coated with a polyamide layer at least on the surface in contact with the fuel.

Said containers are used in the sector of the fuel industry, in particular in the automotive industry, as tanks for automobiles and motor vehicles.

9 Claims, No Drawings

HYDROCARBON VAPOR-IMPERVIOUS CONTAINERS AND PROCESS FOR PRODUCING THEM

This is a divisional of application Ser. No. 08/380,920, filed on Jan. 31, 1995, U.S. Pat. No. 5,567,491; which is an FWC continuation application of Ser. No. 08/144,630, filed on Nov. 2, 1993, abandoned; which is an FWC continuation application of Ser. No. 07/914,222, filed on Jul. 17, 1992, abandoned which is an FWC continuation application of Ser. No. 07/483,650, filed on Feb. 23, 1990, abandoned.

DESCRIPTION OF THE INVENTION

The present invention relates to containers, which are impervious to hydrocarbon vapors and/or liquids, especially to fuels, and to the corresponding manufacturing process.

In particular, the present invention relates to fuel tanks for automotive vehicles which must be impervious to vapors and/or must not exhibit transudation of the hydrocarbon liquids contained therein.

The tanks and/or containers which are impervious to hydrocarbons and/or fuels and form the object of the present invention are used in the field of the fuel industry in general and in particular in the automotive industry.

As is known, growing attention is devoted to the problem of reducing the dispersion and/or leakage phenomena, either of accidental or operative nature, of harmful materials, such as hydrocarbons and the like and in particular of fuels, in the environment, owing to the serious ecological and/or operative consequences thereby involved. In the handling of harmful materials such as hydrocarbons, the most exposed points to possible operative dispersions, due to permeation and/or transudation phenomena, are represented by the storage tanks, in particular the fuel tanks mounted on automotive vehicles or motor vehicles in general. As regards the latter tanks, they are object of particular attention on the part of the manufacturing industry: in fact, such containers have generally a thin thickness, for obvious economic and weight containment reasons, and therefore are exposed to the abovesaid risks of permeation and/or transudation of the hydrocarbons and/or fuels contained in them. That is particularly evident in the case of fuel tanks made of plastic material in general, and especially of high-density and high molecular weight polyethylene, which is commonly used for the manufacture of tanks for cars and motor vehicles. In fact, the abovesaid tanks have a good impact strength also at low temperatures but exhibit a permeability value which, although maintainable at low values, can never be considered as negligible, especially in view of the existing regulations concerning the safety of the transported passangers.

Thus, various treatments aiming at improving the imperviousness and/or anti-transudation characteristics of the plastic materials, in particular of the high-density and high molecular weight polyethylene tanks, have been suggested and somewhat important results have been obtained. Said treatments are substantially of chemical nature, the most known of which are cross-linking, sulphonation and/or halogenation of the tank inner surface in contact with the fuel vapors. These processes, which involve a chemical modification of the concerned surfaces, besides not completely solving the imperviousness problem, have also the drawback of being expensive and of altering the mechanical-dynamic properties of the starting thermoplastic material.

Furthermore, sulphonation is eliminated by the presence of water traces contained in the fuel in consequence of the hydrolysis reaction, while halogenation requires the use of non-corrodible materials and complicated apparatuses for removing the halogen vapors.

From U.S. Pat. No. 3,275,733 and from GB patent No. 1,133,840 is known how to produce hollow containers, particularly suited to contain hydrocarbons, based on poly-omega-lactams prepared by anionic polymerization of the corresponding lactam in rotary molds. These containers offer the advantage, as compared with the polyethylene containers, of being fully impervious to the fuel vapors, but exhibit the drawback of having a low impact strength, especially at low temperatures, besides being disadvantageous from economical view-point.

The Applicant has now found that the permeability and transudation or transpiration of the hydrocarbon vapors from the fuel containers or tanks made of plastic material, in particular of polyethylene, can be eliminated or reduced without altering the mechanical-dynamic properties and in particular the impact strength of such materials, especially at low temperatures, if at least the container or tank surface in contact with the fuel is coated with a thin layer, generally not exceeding 5 mm, of a poly-omega-lactam.

Thus, it is an object of the present invention to provide a container comprising an outer shell of plastic material, in particular high density and high molecular weight polyethylene, completely coated and at least inside with a thin adhering layer of a poly-omega-lactam.

The thickness of the poly-lactam coating generally ranges from 0.1 to 3 mm.

The process for coating, at least inside, the container surface consists in carrying out the anionic polymerization in situ of the omega-lactam directly inside the already formed container, heated to the lactam polymerization temperature and while it is subjected to rotation—on two intersecting axes arranged at an angle to each other.

The process of the present invention consists in the first place, in producing a hollow tank or container of plastic material, such as for example high density and high molecular weight polyethylene, by conventional blow-molding or rotational casting techniques.

Into the tank so produced, heated to a temperature of at least 90° C. and lower than the softening point of the plastic material, the batch to be polymerized is introduced, such batch being heated to a temperature lower by at least 5° C. than the container temperature, and comprising:

a) an omega-lactam having general formula:

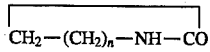  (I)

$$CH_2-(CH_2)_n-NH-CO$$

wherein n is an integer from 1 to 10;

b) a catalyst consisting of a salt of the lactam of formula (I), in which the metal is selected from the alkaline or alkaline-earth metals, and c) a polymerization activator.

In order to improve the impact strength characteristics of the poly-lactam layer, the polymerization batch should preferably contain low amounts, generally not higher than 15% by weight with respect to the lactam, of a polyoxyalkylene polyol having a molecular weight higher than 400 and preferably ranging from 2,000 to 20,000, or of a polyoxypropylene/polyoxyethylene polyol block or random copolymer having a molecular weight ranging from 1,000 to 20,000, or of a polyoxyalkyleneamine having a functionality lower than 3 and preferably ranging from 1.5 to 2.9.

The container is then made to rotate on two—intersecting axes arranged at an angle to each other at an angular velocity, at which the centrifugal forces are lower than the force of gravity, so that the polymerization mass remains in the lower part of the container, which is continuously and homogeneously heated to a temperature ranging from 90° C. to the softening point of the polymeric material forming the container, generally to a temperature lower than 150° C.

Under these conditions, the omega-lactam of formula (I) polymerizes and deposits in successive layers onto the container walls, which are continuously renewed as they pass under the polymerization batch. All the inner walls of the container are thereby coated with a poly-omega-lactam layer. That is achieved by rotating the container—on both rotation axes at the same angular velocity, so that all the inner surface is made to pass under the polymerization mass at the same velocity. When a reinforcement of certain wall areas is required, that is obtained by changing the speed of rotation on the respective axes, so that the areas to be obtained with a higher thickness are brought into contact with the polymerization mass more often than the remaining areas, thereby obtaining a greater number of polymer layers.

The rotation speed of the container is adequate to the polymerization rate of the omega-lactam at the selected temperature, so that the inner surface of the container is completely coated before the polymerization mass has solidified to polymer.

Heating and rotation of the container are carried on for a time which is sufficient to allow a complete polymerization of the omega-lactam; generally said time ranges from 5 to 60 minutes, preferably from 10 to 30 minutes.

The omega-lactam used in the present invention has the general formula:

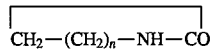 (I)

wherein n is an integer from 1 to 10.

Preferred omega-lactams comprise: epsilon-caprolactam, omega-enantolactam, omega-caprylolactam, omega-laurolactam, either individually or in combination with one another. Epsilon-caprolactam is particularly preferred for reasons of economy and of easy availability.

The catalysts used for the anionic polymerization of the omega-lactams are known; they are used in catalytic amounts. Generally, said catalysts are lactams obtained by reaction of an alkaline or alkaline-earth metal with the omega-lactam. Preferably, sodium or potassium lactams or bromo—magnesium lactams normally dissolved in the omega-lactam are used. A solution containing 15-25% by weight of sodium or potassium lactam in omega-lactam is preferred in the process of the present invention.

The catalyst amount to be used can vary from 0.1 to 15 moles per 100 moles of omega-lactam, preferably from 0.5 to 10 moles and more preferably from 1 to 7 moles per 100 moles of omega-lactam.

As activators of the anionic polymerization of the omega-lactam of formula (I) it is possible to use all those which are known in literature and proposed for such purpose. As an example, the following activators can be cited: acyl lactams, carbamoyl lactams, aliphatic, aryl-aliphatic or cycloaliphatic polyisocyanates, substituted triazines, carbodiimides, cyanamides, isocyanates and the corresponding compounds obtained from the reaction between isocyanates and lactam, triazines and in general all the compounds which contain electron-attractor groups so that by combination with omega-lactam and/or omega-lactamate they cause the opening of the lactam ring, thereby starting the polymerization of the omega-lactam.

The acyllactams described in U.S. Pat. Nos. 3,862,262, 4,031,164, 4,034,015 and 4,223,112, the content of which is an integrant part of the present specification, and the N-substituted carbamoyl lactams described in U.S. Pat. No. 4,540,516, the content of which is an integrant part of the present specification, are the preferred activators in the present invention as they have proved to be the activest.

The concentration of the activator can vary over a wide range, although amounts ranging from 0.01 to 10% by weight referred to the omega-lactam, and preferably ranging from 0.1 to 5% by weight, are generally utilized.

The polyoxyalkylene polyols which are utilizable to improve the impact strength of the poly-lactam layer, according to the present, invention, are compounds well known in literature and comprise polyoxyethylene glycol having a molecular weight, preferably ranging from 6,000 to 20,000, polyoxypropylene glycol having a molecular weight preferably ranging from 2,000 to 10,000 and the glycols or polyols which are copolymers of ethylene oxide and propylene oxide having a molecular weight ranging from 1,000 to 20,000. These copolymers are available on the market, for example under the trademark GLENDION® of the Applicant.

As polyoxyalkylene amines it, is possible to use polyoxypropylene diamines and polyoxytetramethylene diamines and, more particularly, polyoxypropylene diamines having a molecular weight, ranging from about, 200 to about, 2,000, such as e.g. the ones marketed under the trade name JEFFAMINE® D 2000 and JEFFAMINE® D 4000, Also the polyoxypropylene amines having an aminic functionality of about 2.5 and a molecular weight, of about 5,000, which are known under the trade name JEFFAMINE® T 5000 are suited to the object of the invention, The abovesaid commercial products are sold by Texaco Chemical Company, Polyoxyalkylene polyols, copolymers or polyoxyalkylene amines are preferably used in amounts ranging from, 1% to 15%, preferably from 3% t,o 10% by weight,.with respect, to omega-lactam.

Polymerization is conducted under substantially anhydrous conditions: to this purpose, the container is first washed with an inert gas such as nitrogen, to remove air and moisture; then the polymerization mixture is introduced. The polymerization mixture components can be premixed before being introduced into the container, or they can be directly introduced into the cavity in any manner, such as, for example, separately or by premixing and dissolving the catalyst and/or the activator with a part of the omega-lactam.

For rotating the container during the omega-lactam polymerization, any known apparatus for rotational casting can be used, such as, for example, the plant produced by Plasmec Italia and by Caccia Italia.

The poly-omega-lactam coating of the surface in contact with the fuel—what is an object of the present invention—is not limited to the tank or container made of polyethylene, but it can be extended in a broader sense to any polymeric material having a softening point (Vicat point) not lower than 80° C., preferably not lower than 95° C.; the polymeric materials may be homopolymers or copolymers such as for example acetalic resins, acrylonitrile/styrene copolymers (SAN, ABS, AES), polypropylene, ethylene/propylene copolymers, polyvinyl chloride, polyester resins, polymethacrylates, etc.

The containers can have any size and are intended for the use with fuels in the general sense, for which containers there is the problem of the transpiration of the vapors of gasoline or of another fuel.

For a better understanding of the present invention and for putting the same into practice, an illustrative example is given hereinafter, which, however, is not to be considered as to be a limitation of the invention.

EXAMPLE

An automobile tank made of high density and high molecular weight polyethylene by means of the extrusion—blowing technique, having a volume of 35 liters, was placed—into a heating furnace of a rotational casting plant "RMK 230" manufactured by the company Plasmec Italia, equipped with two rotation axes, one of which, the primary axis, rotating from above downwards (19 r.p.m.), and the other, the secondary axis, rotating on itself (27 r.p.m.); the axes formed an angle of 90°. The tank was heated for about 10 minutes until a temperature of 100°–105° C. was reached.

After this heating step, a mixtures consisting of 1230 g of caprolactam (82.4%), 67.5 g of JEFFAMINA$^{(R)}$ D 2000 (4.6%), 120 g of sodium caprolactam at 21% of caprolactam (8%) and 75 g of hexamethylene diisocyanate in 50 g of caprolactam was injected, as a polymerization promoter, into the tank; the temperature of the mixtures was of 95° C.

After a 15-second injection time, the tank was placed again into the furnace, where-the previously reached temperature conditions being maintained (100°–105° C.)—the polymerization of caprolactam was completed; time required: 6 minutes.

The tank was then cooled for about 5 minutes and drawn out by the apparatus arm.

The thickness of the caprolactam deposited inside the tank was of 1–2 mm, distributed all over the inner surface of the tank.

The lined tank was subjected to tests for testing the permeability to the CUNA mixture.

The measurements were carried out at 40° C., after a 20-day conditioning, by-means of gas-chromatography, and the permeability was expressed in g/m$^2$/24 hours.

From the following table it is apparent that the polycaprolactam lining makes the tank impervious to gasoline components.

| CUNA MIXTURE | | UNLINED | LINED |
| --- | --- | --- | --- |
| COMPOUND | % BY VOLUME | TANK | TANK |
| Methyl alcohol | 15 | 1.2 | >0.01 |
| Ethyl alcohol | 4.25 | 0.4 | >0.01 |
| Iso-octane | 25.5 | 1.5 | >0.01 |
| Di-iso-butylene | 12.75 | 0.6 | >0.01 |
| Toluene | 42.5 | 3.0 | 0.03 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A Process for producing a coated container impervious to hydrocarbon vapors in particular to fuel vapors, comprising an outer shell formed from a single layer of polyethylene elastic material, a single thin layer consisting of an in situ polymerized poly-omega-lactam from caprolactam monomers coated on a surface of said single polyethylene plastic layer and adhered thereto, said thin layer covering the plastic layer and being in contact with the hydrocarbon vapor, said thin layer further being formed without substantially altering the mechanical-dynamic properties including impact strength of said polyethylene layer, and wherein said thin layer is between zero and 5 mm in thickness;

wherein the poly-omega-lactam is prepared by polymerization of an omega-lactam having the formula:

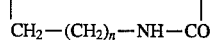

(I)

wherein n is an integer ranging from 1 to 10; and wherein the poly, omega-lactam layer contains amounts not greater than 15% by weight with respect to the polymer, of a polyoxyalkylene polyol having a molecular weight greater than 400, of a polyoxypropylene//polyoxyethylene polyol copolymer having a molecular weight ranging from 1,000 to 20,000, or of a polyoxyalkylene amine having a functionality lower than 3, by carrying out anionic polymerization of the omega-lactam directly inside the plastic material container heated to the lactam polymerization temperature and while it is subjected to rotation on two intersecting axes arranged at an angle to each other.

2. The process according to claim 1, wherein the tank is heated, during polymerization, to a temperature of at least 90° C. and lower than the softening point of the plastic material forming the outer shell.

3. The process according to claim 1, wherein a batch to be polymerized, heated to a temperature by at least 5° C. lower than the container temperature, is introduced into the plastic material container, said batch comprising:

a) an omega-lactam having the general formula

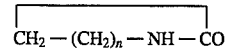

wherein n is an integer ranging from 1 to 10;

b) a catalyst consisting of a salt of the lactam of formula (I), wherein the metal is selected from the alkaline or alkaline-earth metals;

c) a polymerization activator.

4. The process according to claim 3, wherein the batch to be polymerized contains an amount not higher than 15% by weight, with respect to the lactam of formula (I), of a polyoxyalkylene polyol having a molecular weight higher than 400 and preferably ranging from 2,000 to 20,000; of a polyoxypropylene/polyoxyethylene polyol capolymer having a molecular weight ranging from 1,000 to 20,000, or of a polyoxyalkylene amine having a functionality lower than 3 and preferably ranging from 1 . 5 to 2.9.

5. The process according to claim 1 wherein, during the polymerization, the plastic material container is made to rotate on the two axes at an angular velocity, at which the resulting centrifugal forces are lower than the force of gravity, for a time which is sufficient to obtain a complete polymerization of the omega-lactam.

6. The process according to claim 3, wherein the catalyst is sodium lactamate, potassium lactamate or bromo-magnesium lactamate in an amount ranging from 0. 1 to 15 moles, preferably from 0.5 to 10 and more preferably from 1 to 7 moles per 100 moles of omega-lactam.

7. The process according to claim 3, wherein the activator concentration ranges from 0.01 to 10% by weight and preferably from 0.1 to 5% by weight with respect to the omega-lactam.

8. The process according to claim 4, wherein the amount of polyoxyalkylene polyol, of copolymer or of polyoxyalkylene amines ranges from 1 to 15%, preferably from 3 to 10% by weight with respect to the omega-lactam.

9. The process according to any of the preceding claims from 1 to 8, wherein the omega-lactam is epsilon-caprolactam.

* * * * *